United States Patent
Lemberger et al.

(10) Patent No.: US 7,013,833 B2
(45) Date of Patent: Mar. 21, 2006

(54) VALVE STEM PRESSURE POPPET

(76) Inventors: Gary Lemberger, 100 NW., 82nd Ave., Suite 402, Plantation, FL (US) 33324; Brian Lipford, 1009 Longstream Ct., Belair, MD (US) 21014-2580

( * ) Notice: Subject to any disclaimer, the term of this patent is extended or adjusted under 35 U.S.C. 154(b) by 44 days.

(21) Appl. No.: 10/821,439

(22) Filed: Apr. 9, 2004

(65) Prior Publication Data

US 2005/0223966 A1   Oct. 13, 2005

Related U.S. Application Data

(60) Provisional application No. 60/461,580, filed on Apr. 8, 2003.

(51) Int. Cl.
*B60C 23/04* (2006.01)

(52) U.S. Cl. .................. 116/34 R; 116/266; 116/276; 73/146.8; 73/146.3

(58) Field of Classification Search ............. 116/34 R, 116/34 A, 34 B, 266, 268, 276, 277, 279; 73/146, 146.2, 146.3, 146.8

See application file for complete search history.

(56) References Cited

U.S. PATENT DOCUMENTS

| | | | | |
|---|---|---|---|---|
| 905,778 A | * | 12/1908 | Wolff | 73/146.2 |
| 1,236,411 A | * | 8/1917 | Downs | 116/34 R |
| 1,361,285 A | * | 12/1920 | Nuss | 73/146.8 |
| 1,423,447 A | * | 7/1922 | Noe | 137/225 |
| 1,478,506 A | * | 12/1923 | Bromberg | 137/227 |
| 1,482,947 A | * | 2/1924 | Shorts | 137/227 |
| 1,499,327 A | * | 7/1924 | Badowski | 137/227 |
| 1,565,423 A | * | 12/1925 | Dailey | 73/146.8 |
| 1,606,740 A | * | 11/1926 | Badowski | 73/146.3 |
| 1,807,752 A | * | 6/1931 | Poster | 73/146.8 |
| 3,063,463 A | * | 11/1962 | Gfoll | 137/228 |
| 3,111,930 A | * | 11/1963 | Zipper | 116/34 R |
| 3,236,097 A | * | 2/1966 | Tessmer | 73/146.8 |
| 3,451,418 A | * | 6/1969 | Koike et al. | 137/227 |
| 3,929,090 A | * | 12/1975 | Su | 116/34 R |
| 4,024,829 A | * | 5/1977 | Su | 116/34 R |
| 4,155,325 A | * | 5/1979 | Yu | 116/34 R |
| 4,174,673 A | * | 11/1979 | Tung et al. | 116/34 R |
| 4,199,993 A | * | 4/1980 | Graczyk | 73/744 |
| 4,362,121 A | * | 12/1982 | Pegram | 116/34 R |
| 4,366,708 A | * | 1/1983 | Warihashi | 73/146.8 |
| 4,465,013 A | * | 8/1984 | Malec | 116/34 R |
| 5,014,643 A | * | 5/1991 | Huang | 116/34 R |
| 5,886,254 A | * | 3/1999 | Chi | 73/146.8 |
| 6,588,264 B1 | * | 7/2003 | Johnson | 73/146.8 |
| 6,911,903 B1 | * | 6/2005 | Gladstone et al. | 340/442 |

* cited by examiner

*Primary Examiner*—Christopher W. Fulton
*Assistant Examiner*—Amy R. Cohen
(74) *Attorney, Agent, or Firm*—Law Offices of Royal W. Craig (57) ABSTRACT

A valve stem pressure poppet incorporated into a tire valve cap for monitoring tire air pressure. The indicator assembly is screw attached by a connector onto an existing valve stem. The assembly includes a hollow outer tube for housing a slideably disposed indicator, a sealed space above the indicator, a compression spring and a connector end fitting. An air passage runs throughout the length the indicator. Once the assembly is engaged, pressurized air feeds directly through the indicator into the sealed space, forcing the indicator down against the force of the compression spring. If the tire remains above a predetermined critical low pressure point, the indicator will remain in the down "equilibrium" position. However, if the air pressure in the tire drops below the critical pressure point the compression force of the spring will overcome the downward pressure on the indicator, and the indicator disengages or "pops" up.

15 Claims, 7 Drawing Sheets

VALVE STEM PRESSURE POPPET

CROSS-REFERENCE TO RELATED APPLICATIONS

The present application derives priority from U.S. Provisional Patent Application No. 60/461,580 for "VALVE STEM PRESSURE POPPET", Filed: Apr. 8, 2003.

BACKGROUND OF THE INVENTION

1. Field of the Invention

The present invention relates to air pressure indicators and, more particularly, to an air pressure indicator incorporated into the valve stem cap of a tire.

2. Description of the Background

Proper tire inflation requires that the correct air pressure be maintained in the tire, and is important for achieving optimal fuel efficiency and increasing tire life. Under inflated tires can result in fast and excessive wear on the outside of the tread as well as improper vehicle handling. Over inflated tires can result in fast and excessive wear on the middle part of the tread and are more rigid, possibly leading to a blowout.

A common method for monitoring tire air pressure involves manually removing the valve cap and applying a tire gauge to the valve stem. This method poses several hardships for the operator. First, the method is complicated by the need for an additional tool, the tire gauge, which may be unavailable when needed and must be purchased at an additional cost to the operator. Second, the operation is time consuming for the operator as he must remove the valve stem cap for each tire, apply the tire pressure gauge, and re-fasten the valve stem caps. Finally, the process exposes the operator to brake dust and road dirt which naturally accumulate on tire valves.

There have been past efforts to develop air pressure indicators incorporated into the valve stem cap of a tire. For example, U.S. Pat. No. 6,374,666 to the inventor named herein discloses a tire pressure gauge apparatus that may be secured to the valve stem in a vehicle tire. A pressure indicator element displays a pressure reading of received air from within the tire which varies with the position of a pressure equilibration structure so that alteration of the pressure of received air within a received air chamber from the valve stem causes movement of the equilibration structure within the housing to re-establish pressure equilibrium between biasing air sealed within the biasing air chamber and received air within the received air chamber, and movement of the equilibration structure causes the indicator element to move relative to the housing to provide a received air pressure reading.

U.S. Pat. No. 5,929,330 to Ford discloses a pressure gauge that provides a simple, efficient and highly visual indication of pressure change from a normal condition to various abnormal conditions.

U.S. Pat. No. 5,569,849 to Cummings discloses a visual tire cap pressure gauge for visually indicating when air pressure within the tire drops below a set point, so as to enable a person at a glance to tell if the tire needs more air.

U.S. Pat. No. 5,115,832 to Higdon et al. provides visual indication of under-inflated condition.

U.S. Pat. Nos. 4,606,391 and 4,819,686 to Achterholt discloses a valve cap adapted to be screwed onto the valve of a pneumatic tire to provide a pressure drop indication.

U.S. Pat. Nos. 4,520,664 and 5,027,740 to Kramer disclose a tire pressure indicator for visual observation of tire pressure including a screw-on cartridge containing a spring-biased piston with a movable shield which covers a central indicator pilot when tire pressure is up to requirements. When pressure is below what it should be, the piston retracts to allow the shield to expose indicator pilot to the view of an observer, thus serving as a warning that inflation is required.

U.S. Pat. No. 4,480,580 to Nalence discloses a low tire pressure warning device which includes a housing, a bladder and/or spring loaded piston within the housing and a colored warning streamer. The bladder, upon contraction, axially moves a spring-loaded piston so as to "pop out" the colored warning streamer.

U.S. Pat. No. 4,464,929 to Willis discloses a tire cap pressure gauge for mounting upon a tire valve stem and measuring tire pressure that has a housing, a manually operated plunger extending axially through the housing, a spring extending about the plunger, a piston biased by the spring and having indicia. The housing has multiple windows with indicia proximate thereto for viewing the position of the piston.

U.S. Pat. No. 4,362,121 to Pegram discloses a deflation warning device for a pneumatic tire which gives a clear, positive indication of a predetermined pressure loss by the exposure of a brightly colored element within a transparent dome.

U.S. Pat. No. 4,174,673 to Tung et al. discloses a low pressure warning cap for a pneumatic tire air valve including a threaded connector for attachment to a conventional air valve stem.

U.S. Pat. No. 4,079,691 to Curado discloses a tire pressure indicator that uses a poppet. When the pressure in the tire drops to a predetermined level, the poppet moves to a second position releasing air into the cap. An indicating element normally concealed within the cap is projected from the cap by the released air to provide a visual warning of the tire pressure drop.

U.S. Pat. No. 4,008,744 to Botsis et al. discloses a tire failure indicator that includes a housing mounted in an air tight relation about the tire valve and between the tire valve and the rim valve opening.

U.S. Pat. No. 3,827,393 to Winther discloses an attachment for a pneumatic tire that contains a pressure differential-responsive valve communicating with the interior of the tire and operative to activate a conspicuously decorated signal making unit to cause the unit to be displayed for visual observation when air pressure in the tire for any reason is reduced to a predetermined undesirably low value.

Of the foregoing, only the present inventor's '666 patent provides a tire gauge apparatus which relies on pressure equilibration against a mechanical spring to produce a tire pressure reading (whereby pressurized air entering the valve acts directly on the indicator to oppose a spring force, forcing the indicator to withdraw to a concealed "proper pressure" position). There remains a significant commercial need for this type of pressure equilibration poppet valve which additionally gives a clear, positive indication of a predetermined pressure loss by the exposure of a brightly colored element within a transparent dome, all moving parts of the device being fully enclosed and protected against the ingress of dirt and corrosion by a sealed housing.

SUMMARY OF THE INVENTION

It is, therefore, an object of the present invention to display and monitor the air pressure of a tire by incorporating a spring-biased poppet-type air pressure indicator into a tire valve stem cap, the cap having an opening running substantially through the center of the indicator into an outer chamber to oppose the spring biased poppet in a normal-pressure state, thereby keeping the poppet under equilibrium unless pressure in the tire is too low (which pops the poppet). This allows a sealed configuration with fewer parts.

It is another object of the present invention to provide an air pressure indicator with an operative brightly colored hemispherical indicator poppet, visible at a glance, which gives a clear, positive indication of a predetermined pressure loss by the exposure of a brightly colored element within a transparent dome, all moving parts of the device being fully enclosed and protected against the ingress of dirt and corrosion by a housing.

According to the present invention, the above-described and other objects are accomplished by providing an air pressure indicator assembly incorporated into a tire valve stem cap which attaches to the threads of an existing valve stem.

The tire valve stem cap includes an outer tube with a closed transparent hemispherical upper end and an open lower end. The outer tube houses an indicator, a compression spring, and a stem connector end fitting.

The indicator comprises a colorful hemispherical head, a body, and a downwardly protruding ferrule. A first lateral annular groove is formed in the lower part of the hemispherical head for placement of a first O-ring to create an upper sealed space between the hemispherical head and the hemispherical end of the outer tube. A second lateral annular groove is formed in the lower part of the indicator body for placement of a second O-ring. A central air passage runs the length of the indicator emptying into the upper sealed space.

The stem connector end fitting is a cylindrical body comprising an upper and a lower section; the upper section having a greater diameter than the lower section. The stem connector end fitting is further defined by a central through bore. The diameter of the through bore in the upper section sized for slideably receiving the body of the indicator and the diameter of the through bore in the lower section sized for slideably receiving the downwardly protruding ferrule. The upper section of the end fitting is further comprised of a plurality of lateral bleed ports, the position of the ports corresponds to the second O-ring when the indicator is slideably engaged within the stem connector end fitting. The junction between the upper and lower sections of the end fitting is further defined by an annular hub with radial flange.

The compression spring is biased between the stem connector end fitting hub and the bottom of the hemispherical indicator head, thus encircling the upper section of the stem connector end fitting and the body of the indicator.

The cap further comprises a stem connector with a central through bore having internal threads for simultaneous screw attachment to an existing valve stem and to the stem connector end fitting. A third O-ring is positioned within the stem connector to create an airtight seal between the existing valve stem and stem connector end fitting. Slideably disposed around the connector is a collar which is inserted into and fixed within the open end of the outer tube.

In operation, the threaded end of the stem connector is screw-inserted onto an existing valve stem of a tire and the outer tube is depressed. This engages the indicator in the down position with the lower O-ring sealing the bleed ports in the stem connector end fitting. In addition the ferrule actuates the Schrader valve of the valve stem, causing air pressure to escape from the tire. The air pressure feeds directly up the central air passage of the indicator into the upper sealed space and exerting a downward force on the indicator head against the upward force of the compression spring. For so long as the pressure in the tire remains at a predetermined critical level (i.e. substantially 30–35 p.s.i.) the indicator will remain in the down "equilibrium" position, even when the outer tube is released. However, if the air pressure in the tire drops below a predetermined critical level (i.e. 30 p.s.i.), the upward force of the spring will begin to overcome the downward pressure and the indicator will begin to slide upward. In addition, once the bleed ports of the end fitting are uncovered, pressurized air will also enter the space beneath the indicator head acting as an upward force against the indicator. The combination of upward forces causes the indicator to disengage or "pop" up. The brightly colored popped indicator will be visible through the transparent hemispherical upper end of the outer tube.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

Figure 1:
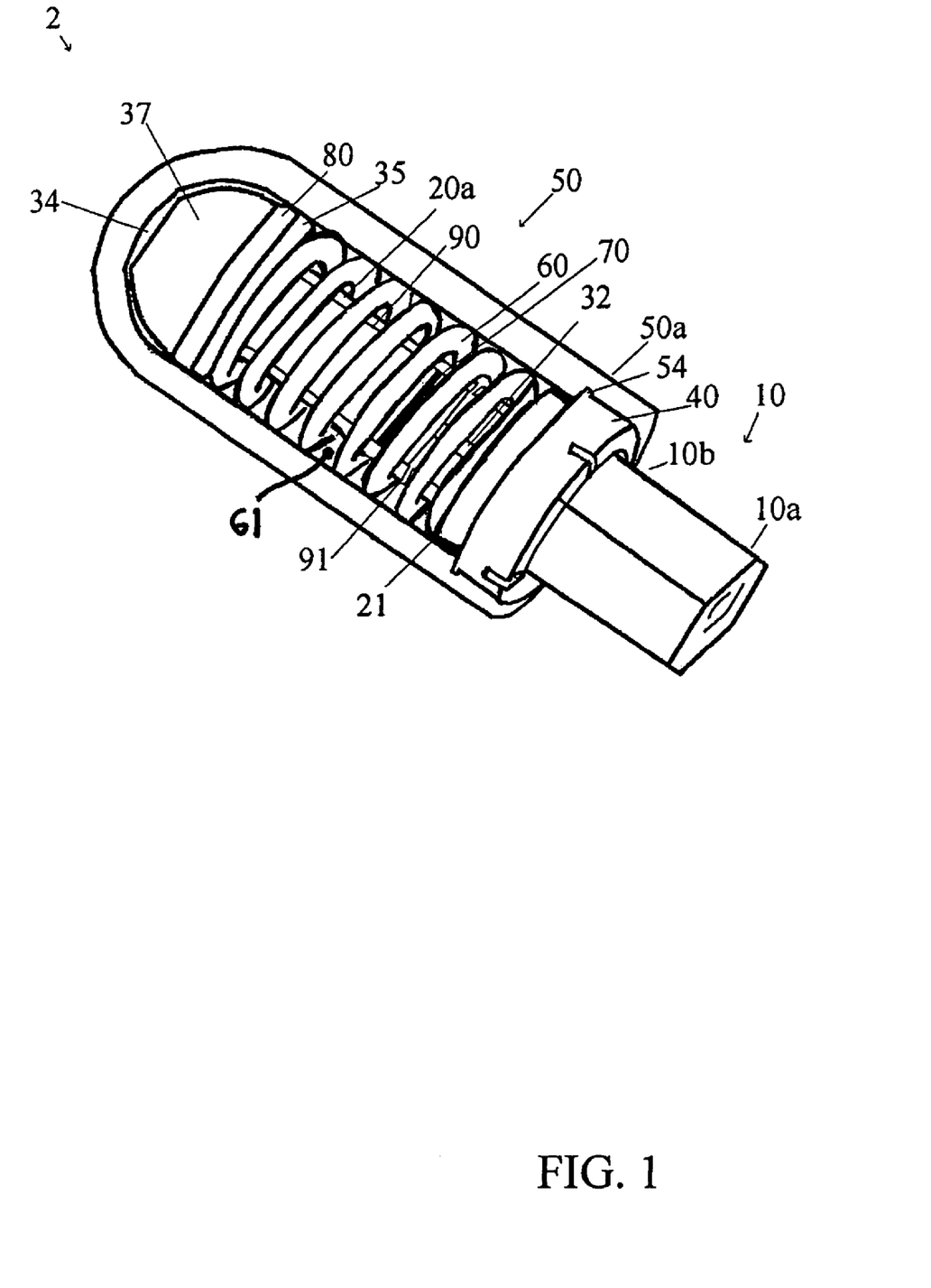
FIG. 1 is a perspective view of the indicator assembly 2 according to the present invention.
Figure 2:
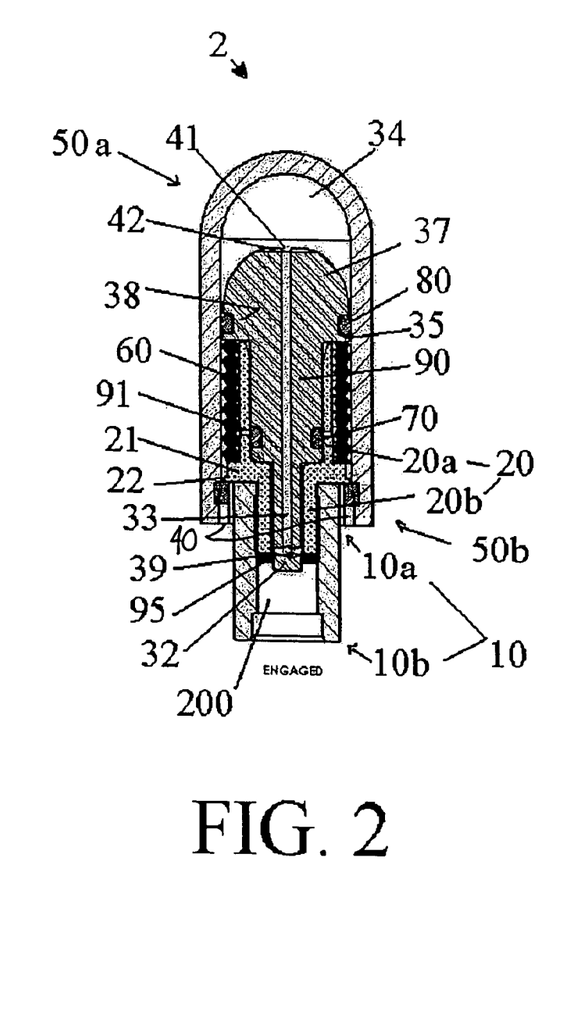
FIG. 2 is a side cross-section of the indicator assembly 2 of FIG. 1 shown in an engaged position.
Figure 3:
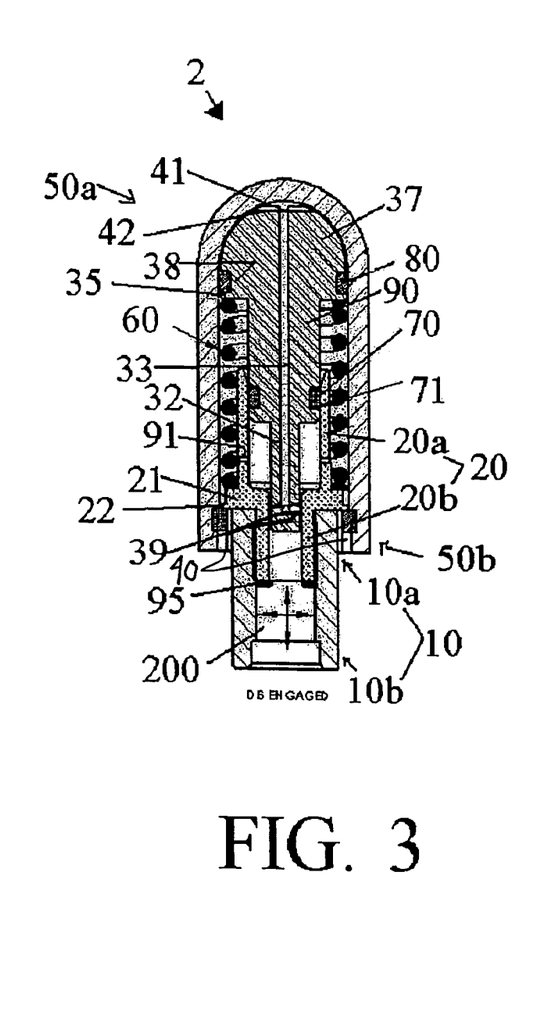
FIG. 3 is a side cross-section of the indicator assembly 2 as in FIG. 2 shown in a disengaged or "popped" position.

With reference to the FIGS. 1–3, the present invention is a tire valve stem cap 2 that incorporates an improved air pressure indicator assembly for mounting directly to the existing valve stem of a tire. FIG. 1 is a perspective view of cap 2, and FIGS. 2 and 3 are side cross-sections of the cap 2 in an engaged position, and a disengaged or "popped" position, respectively. FIGS. 4–13 illustrate various individual components of the indicator assembly and are discussed in more detail below.

Referring to FIGS. 1–3 in combination for an illustration of the invention as a whole, the tire cap 2 generally comprises a hollow outer tube 50 for housing an indicator 30, a compression spring 60, and a stem connector end fitting 20.

Figure 6:
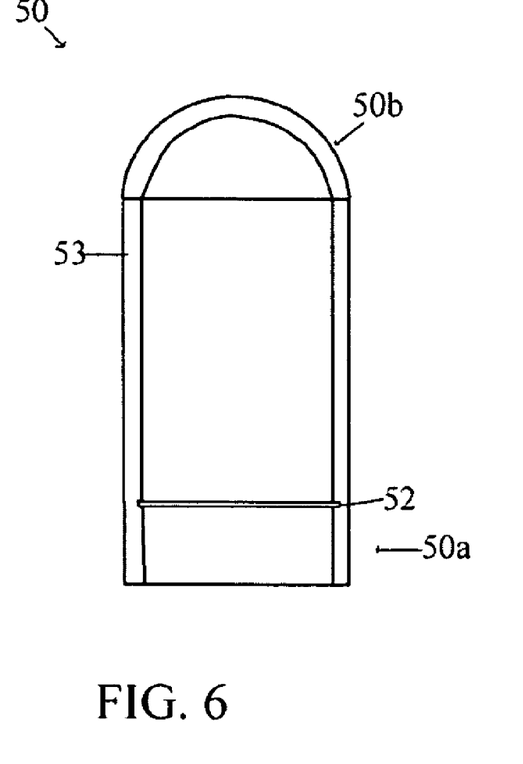
FIGS. 6 and 7 are enlarged side and top views, respectively, of the outer tube 50.
Figure 7:
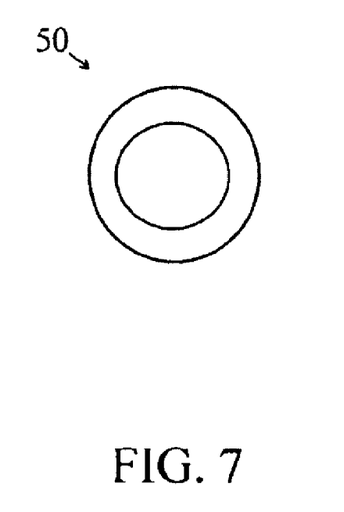

Referring also to FIGS. 6 and 7, the outer tube 50 is comprised of a transparent hemispherical closed upper end 50a and an open lower end 50b. The tub 50 is formed of clear acrylic plastic or other tough transparent plastic view the indicator 30. The interior surface of the upper section 50a of the outer tube 50 is likewise formed in a hemispherical configuration (dome). The interior dimensions of the outer tube 50 are slightly larger than the indicator 30 for telescoping insertion of the indicator 30 therein. An annular inner channel 52 is formed laterally around the inner wall of tube 50 in lower section 50b to seat a collar 40 therein (See discussion of collar 40 below).

Figure 4:
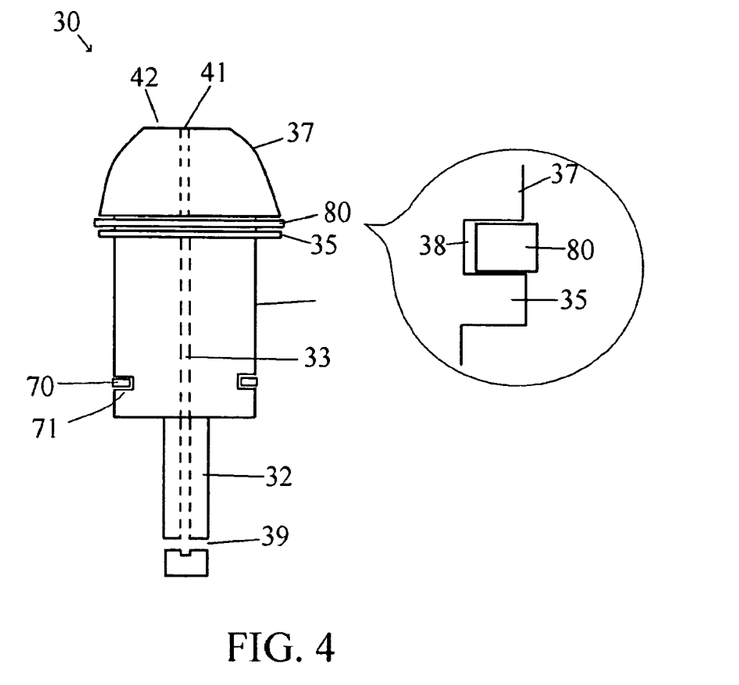
FIGS. 4 and 5 are enlarged side and top views, respectively, of the hemispherical indicator 30.
Figure 5:
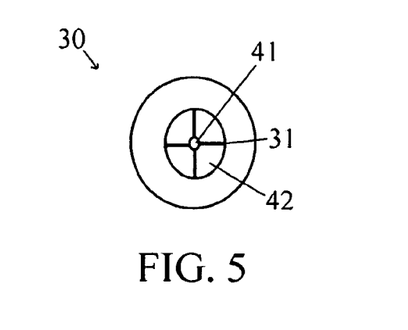

Referring also to FIGS. 4 and 5, the indicator 30 is slideably disposed within the outer tube 50 and is a cylindrical spring biased poppet-type indicator 30, having a hemispherical head 37, a body 90 and a downwardly protruding ferrule 32. The head 37 is brightly colored and further defined by a lateral annular groove 38, forming a collar 35 immediately below and adjacent the indicator head 37. Seated in the groove 38 is a first o-ring 80. The first o-ring 80 creates an upper sealed space 34 between the indicator head 37 and the transparent hemispherical closed upper end of the outer tube 50a. The collar 35 also serves as an anchor for one end of a compression spring 60. A second lateral annular groove 71 is formed in the lower part of the indicator body for placement of a second O-ring 70. A central air passage 33 runs the length of the indicator emptying into the upper sealed space with a plurality of lateral entrance apertures 39 on the ferrule 32 and an exit aperture 41 on top of head 37. The diameter and length of the indicator 30 is slightly smaller than the interior diameter and length of the tube 50 to allow air to fill the space 34 when the device is engaged. The indicator 30 is preferably a unitary molded plastic component colored a bright red or other bright color for 360 degree viewing of its vertical position. The head 37 is flattened at the top 42 and is defined by a series of ribs 31 for maintaining a clearance against the hemispherical inner surface of the upper section 50b of hollow outer tube 50. While the indicator head 37 and upper section 50b of the outer tube 50 are described herein as having the preferred hemispherical shape, those skilled in the art will recognize that other mating shapes may also be suitable for the present invention.

Figure 10:
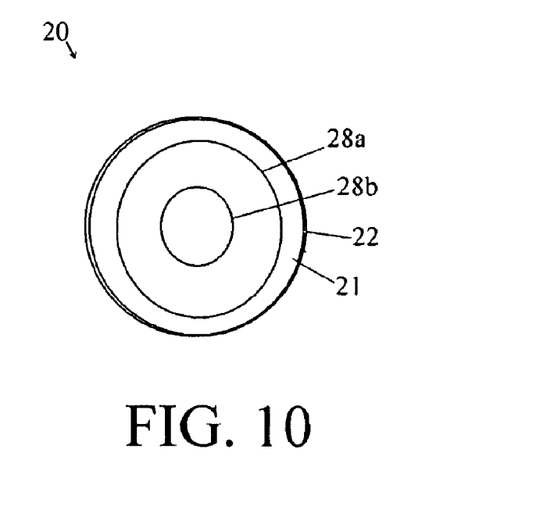
FIGS. 10 and 11 are enlarged top and side views, respectively, of the stem connector end fitting 20.
Figure 11:
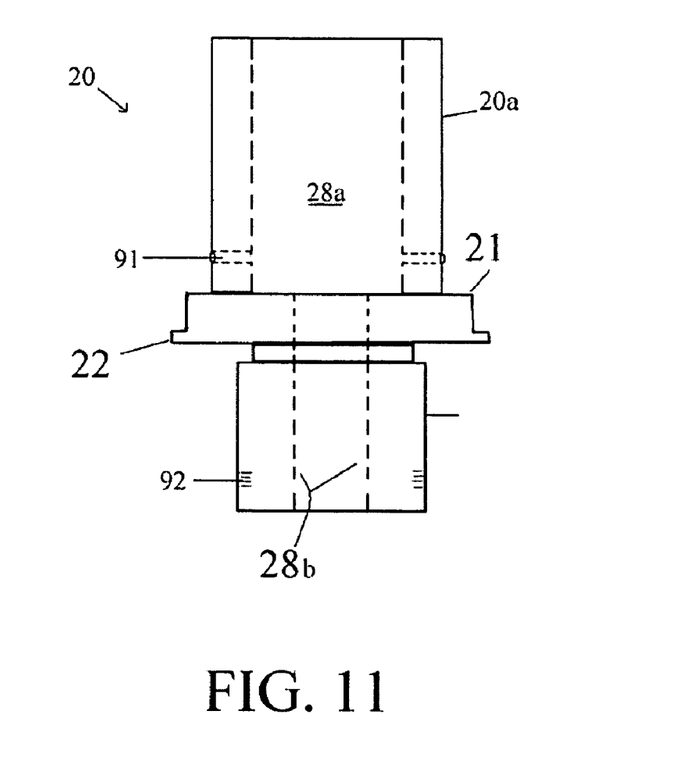
Figure 12:
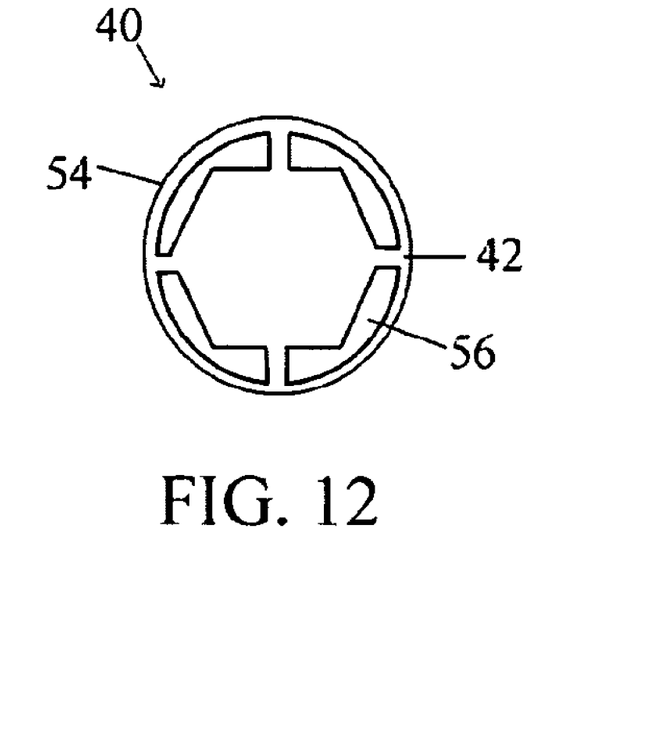
FIGS. 12 and 13 are enlarged bottom and side views, respectively, of the collar 40.

Referring to FIGS. 10 and 11, the stem connector end fitting 20 is a cylindrical body comprising an upper and a lower section (20a and b); the upper section 20a having a greater diameter than the lower section 20b. The stem connector end fitting 20 is further defined by a central through bore 28. The larger diameter of the through bore 28a in the upper section is sized for slideably receiving the body 90 of the indicator 30 and the smaller diameter of the through bore 28b in the lower section is sized for slideably receiving the downwardly protruding ferrule 32. The upper section of the end fitting 20a is further comprised of a plurality of lateral bleed ports 91, the position of the ports 91 corresponds to the second O-ring 70 when the indicator 30 is slideably engaged within the stem connector end fitting 20. The junction between the upper and lower sections of the end fitting is further defined by an annular hub 21 with radial flange 22 protruding outward slightly therefrom. The stem connector end fitting 20 may be formed of brass, bronze, aluminum alloy, or other material with like properties. The lower section 20b is further comprised of a threaded outer surface 92 for screw attachment to a stem connector 10.

The compression spring 60 is biased between the stem connector end fitting hub 21 and the bottom of the collar 35, thus encircling the upper section 20a of the stem connector end fitting and the body 90 of the indicator.

Figure 8:
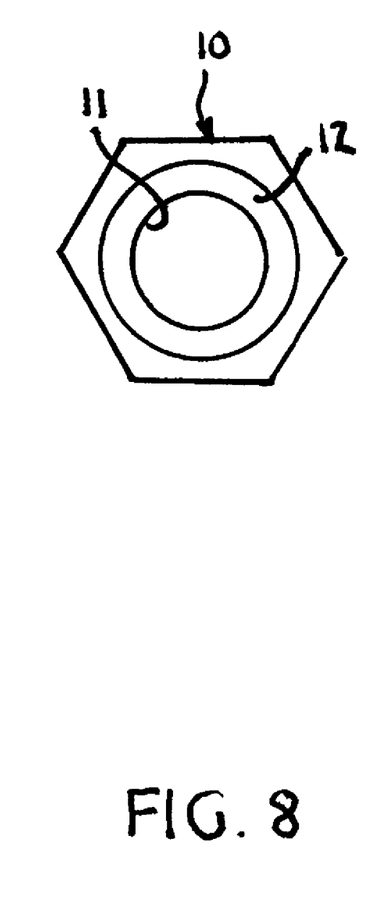
FIGS. 8 and 9 are enlarged top and views, respectively, of the stem connector 10.
Figure 9:
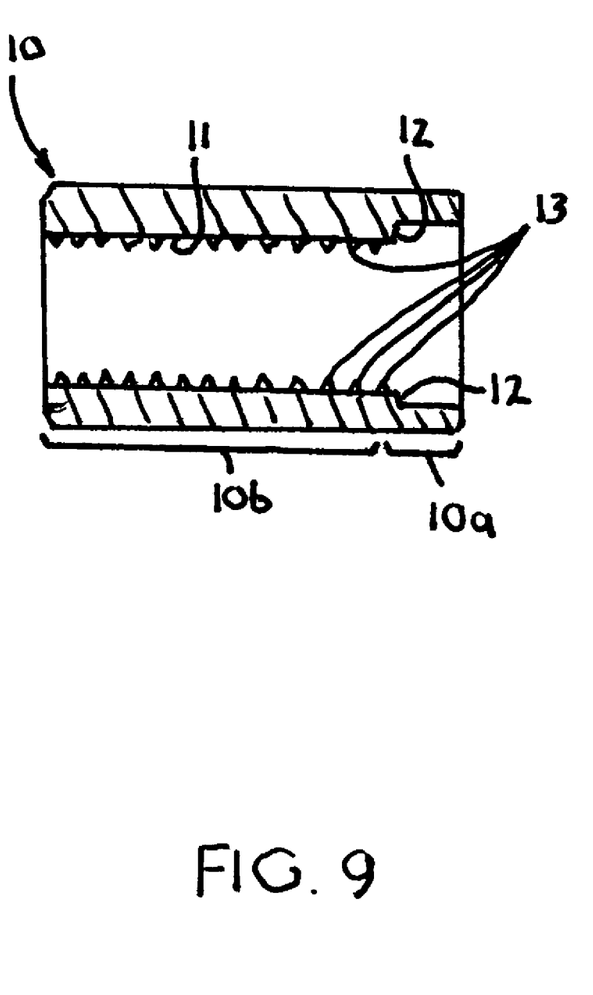

Referring to FIGS. 8 and 9 the tire cap 2 is further comprised of the stem connector 10. The stem connector 10 may also be formed of brass, bronze, aluminum alloy or other corrosion-resistant material and preferably has a hexagonal outer surface (for wrench-tightening). The stem connector 10 (including an upper section 10a and a lower section 10b) is defined by a hollow through-bore 11 leading to a chamfered section 12 at the end of its lower section 10b. The surface of the through bore 11 is further defined by inner screw threads 13 for tightening the lower section 10b onto a tire valve stem 200 (not shown) and for securing the upper section 10a to the stem connector end fitting 20. Stem connector 10 is slidably disposed within a collar 40 that is sized for a close friction fit against the outside of the upper section 10a of stem connector 10. The stem connector 10 is further comprised of a third o-ring 95 that creates an air-tight seal between the existing valve stem 200 and stem connector end fitting 20 when both are screw attached to the connector 10.

Figure 13:
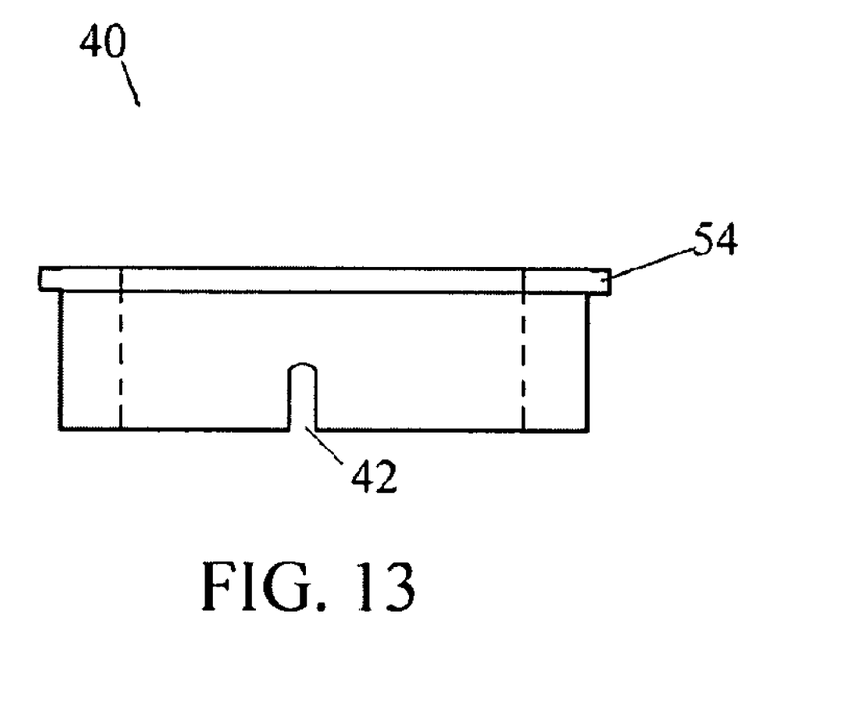

The collar 40 (See FIGS. 12–13) is inserted into the lower section 50a of tube 50 and attached thereto (i.e. by screw-threading, interlocking annular ring 54 of collar 40 into corresponding annular channel 52 of tube 50 as in FIGS. 6 and 13, or any other suitable means). The collar 40/tube 50 assemblage is telescopically mounted on stem connector 10, and the friction fit of collar 40 seals the junction. Thus, a closed chamber 61 is created inside tube 50 which houses the compression spring 60, indicator 30 and stem connector end fitting 20. A plurality of notches 42 on the collar 40 facilitate installation and removal using a conventional spanner type wrench. The interior surface 56 of collar 40 is sized for a close friction fit against the exterior surface of the upper section 10b of stem connector 10. As with the stem connector 10 and stem connector end fitting 20, the collar 40 may likewise be formed of brass, bronze, aluminum alloy, or like material.

To assemble the foregoing components, the indicator 30 and compression spring 60 are inserted into the clear outer tube 50. Next, the stem connector end fitting 20 is threaded into the upper section 10b of the stem connector 10, and this sub-assembly is also inserted into tube 50 between the spring 60 and indicator body 90 and onto the downwardly protruding ferrule 32. At this point, the compression force of compression spring 60 is exerted against the subassembly of stem connector end fitting 20 and stem connector 10 out of the tube 50. Collar 40 inserted around stem connector 10 and fixed into tube 50 (i.e. threading or ring 54 connects with corresponding channel 52). Friction holds collar 40 and thus tube 50 onto connector 10, while also allowing the collar 40 to slide along connector 10 when the cap 2 is engaged on a tire valve stem 200 and tube 50 is depressed.

Given the assemblage of parts described above, the tire cap 2 is screwed onto the tire valve stem 200 and engaged. The operator screws connector 10 onto an existing tire valve stem 200 and depresses the outer tube 50 radially inwards towards the center of the tire. Depressing the outer tube 50 slides the collar 40 along connector 10 and eventually forces the indicator 30 to slide, against the spring bias from compression spring 60, towards the tire. This downward force engages the indicator in the down position with the second O-ring 70 sealing the bleed ports 91 in the stem connector end fitting 20, eliminating any upward force from air seeping out of the end fitting 20 and under collar 35. As the indicator 30 slides towards the tire, the ferrule 32 of indicator 30 is forced against the Schrader valve in the tire valve stem 200. The force of the ferrule 32 actuates the Schrader valve, releasing air pressure from the tire through lateral apertures 39 and into the central air passage 33 of the indicator 30. The third O-ring 95 prevents air from escaping between the tire valve stem 200 and the stem connector end fitting 20. The air is forced up through air passage 33, exits passage 33 at exit aperture 41 in head 37 and enters the sealed space 34 between the tube 50 and the indicator 30.

The combination of the downward forces against the indicator 30 (supplied externally depression of tube 50 and internally by air entering sealed space 34) compresses compression spring 60 and holds the indicator 30 in a down position. For so long as the tire pressure remains above a predetermined critical pressure point (For example, substantially 30–35 p.s.i.), the down-pressure on the indicator 30 (exerted by air in sealed space 34) will maintain the indicator in this position. The indicator 30 remains in equilibrium in the down position with the Schrader valve forced open by ferrule 32. When the operator releases tube 50, the pressure in the sealed space 34 causes the tube 50, sliding on collar 40, to move outward away from the tire. The indicator 30 will stay in the down position (with compression spring 60 compressed) due to the equilibrium of forces (See FIG. 2). Specifically, sufficient air pressure passing through air passage 33 into sealed space 34 exerts enough downward pressure against head 37 to cause the indicator 30 to remain in the down position. However, if the tire pressure drops below a pre-determined critical pressure point (i.e. a calibrated level of substantially 30 p.s.i.), the upward compression force of the spring 60 will cause the indicator 30 to slide upward. Once the bleed ports 91 of the end fitting 20 are uncovered, pressurized air will also enter the space beneath the indicator head acting as a second upward force against the indicator. The combination of upward forces causes the indicator 30 to disengage or "pop" up to the position shown in FIG. 3 and the brightly colored hemispherical indicator head 37 becomes clearly visible at a glance through the transparent upper section 50b of tube 50. The operator will have a clear 360 degree indication of pressure loss.

Varying the pre-determined critical pressure point may be accomplished by changing the compression spring 60 (i.e. different compression springs have different compression forces). The greater the spring's compression force, the more air pressure required to keep the indicator in the down position and vice versa. Alternatively or in combination with changing the spring's compression force, the critical pressure point may be varied by changing the areas of the spaces sealed by the first and second O-rings (80 and 70). These two spaces will always have different areas with the upper space 34 having a greater area, but adjusting the relative sizes will trigger the indicator 30 at different tire pressures. In this manner a variety of different indicator assemblies 2 may be made available for use with pneumatic tires having a variety of pressure ratings, including pneumatic tires for cars, trucks, other heavy duty commercial vehicles.

It is also noteworthy that the design of the tire cap 2 includes a significant safety feature. Specifically, when the indicator 30 actuates (e.g., pops out), the ferrule 32 of indicator 30 necessarily lifts off the Schrader valve of the tire valve stem 200 stopping air flow out of the tire. This restores the original tire pressure boundary, and no longer relies on the device 2 for sealing tire pressure.

Optional features may be incorporated as desired to further the visibility. For example, a battery and LED embedded in the device will create a flashing warning light when the indicator pops. Additionally, a focusing bevel/lens on top of the outer tube may be added for better viewing of device from the backside. Lastly, an air filter can be placed somewhere in the internal air passage to stop debris from the truck tire or the outside environment entering the device.

Overall size and shape may be varied as desired for aesthetics and performance. In all cases the tire cap 2 with incorporated low pressure indicator will give a clear, positive indication of a predetermined pressure loss by the exposure of the brightly colored indicator 30 within the transparent dome of tube 50. Moreover, all moving parts of the device are fully enclosed and protected against the ingress of dirt and corrosion by outer tube 50.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the claims.

We claim:

1. A tire valve stem cap incorporating a visible air pressure indicator, said cap comprising:
   a hollow outer tube having a closed hemispherical transparent upper end and open lower end;
   a stem connector for attachment at one end to an existing tire valve stem, said stem connector being sized for a close fit in the open outer end of said outer tube;
   an indicator comprised of a hemispherical head conforming to the closed transparent upper end of said outer tube and visible there through, and a body protruding therefrom, said hemispherical head being defined by a lateral annular groove and a first O-ring seated in said groove to create a seal against said hollow outer tube said indicator further having a central air passage through the head and body, said indicator being slidable within said outer tube from an up to a down position;
   a compression spring having a calibrated bias encircling said indicator and biased against the hemispherical head for biasing said indicator toward said up position;
   whereby when said tire valve stem cap is engaged on an existing tire valve stem, pressurized air from said tire passes from said tire stem valve through said indicator central air passage to maintain said indicator in equilibrium in said down position against the bias of said spring, but if, but if air pressure in the tire drops below a calibrated level the excess spring bias of said spring will cause said indicator to pop up and become visible inside said transparent end of said outer tube.

2. The tire cap according to claim 1, wherein said central through bore of said stem connector is threaded for screw attachment to said tire valve stem.

3. The tire cap according to claim 1, further comprising a collar attached inside the lower open end of said outer tube and around said stem connector; said collar sized for a close friction fit around said stem connector and for insertion into and attachment to said outer tube lower end.

4. The tire cap according to claim 3 wherein said lower end of said outer tube is further comprised of an internal annular channel and said collar is comprised of a corresponding annular ring for attaching said outer tube onto said collar.

5. The tire cap according to claim 3, wherein said collar and said lower section of said outer tube are threaded for screw attachment.

6. The tire cap according to claim 5, wherein said indicator body is further defined by a lateral annular groove for seating a second o-ring and said end fitting further comprises of a plurality of bleed ports corresponding in position to said second o-ring such that when said indicator is fully engaged (seated) in said end fitting the bleed ports are sealed, preventing pressurized air from entering the space beneath the spring bias collar, and when air pressure falls below said calibrated level the indicator slides upward, allowing pressurized air to pass through said bleed ports and creating an additional upward force beneath said collar causing said indicator to pop up.

7. The tire cap according to claim 1, wherein said indicator head is brightly colored to be clearly visible through the transparent upper section of the outer tube when popped up.

8. The tire cap according to claim 1, wherein said transparent end of said outer tube is hemispherical for receiving a hemispherical indicator head and for providing 360 degree visibility when said indictor is popped up.

9. The tire cap according to claim 8, wherein said hemispherical indicator head further comprises a flat top having a plurality ribs for maintaining a clearance against the hemispherical transparent end of said outer tube.

10. The tire cap of claim 1, wherein said stem connector is further comprised of a hexagonal outer surface for easy wrench tightening.

11. A tire valve stem cap incorporating a visible air pressure indicator, said cap comprising:
an indicator, a spring and a stem connector end fitting housed within a hollow outer tube having a closed hemispherical transparent upper end and open lower end; said indicator comprising a hemispherical head conforming to the closed transparent upper end of said outer tube and visible there through, and a body protruding therefrom, said hemispherical head being defined by a lateral annular groove and a first O-ring seated in said groove to create a seal space within the hemisphere of said hollow outer tube, said indicator further having a central air passage through the head and body leading to an exit aperture into said seal space, said indicator being slidable within said outer tube from an up to a down position;
a stem connector for attachment at one end to an existing tire valve stem and at an opposing end to said end fitting, said stem connector and end fitting each having central through bores;
a bias spring anchored between said end fitting and indicator head, said spring for sliding said indicator away from said end fitting towards said transparent end;
whereby when said cap is engaged on an existing tire valve stem, pressurized air from said tire passes from said tire stem valve through said indicator central air passage and into said first sealed space forcing said indicator in a normally closed (down position) equilibrium against the spring bias of said spring, but if air pressure in the tire drops below a calibrated level the excess spring bias of said spring will cause said indicator to pop up and become visible inside said transparent end of said outer tube.

12. The tire cap according to claim 11, wherein said central through bore of said stem connector is threaded for screw attachment to both said end fitting and said tire stem.

13. The tire cap according to claim 12, wherein said end fitting is a cylindrical body having an larger diameter upper section and a smaller diameter lower section, for slideably receiving the body and ferrule of the indicator, respectively, and wherein the junction between the upper an lower section is further defined by an annular upper hub with a radial flange for anchoring said spring and said lower section has a threaded outer surface for screw attachment to said stem connector.

14. The tire cap according to claim 11, wherein a collar is slideably disposed around said stem connector; said collar sized for a close friction fit around said stem connector and for insertion into and attachment to said outer tube lower end.

15. The tire cap according to claim 10, wherein said spring is a compression spring having a predetermined compression force.

* * * * *